United States Patent [19]

Noya et al.

[11] Patent Number: 5,420,983
[45] Date of Patent: May 30, 1995

[54] METHOD FOR MERGING MEMORY BLOCKS, FETCHING ASSOCIATED DISK CHUNK, MERGING MEMORY BLOCKS WITH THE DISK CHUNK, AND WRITING THE MERGED DATA

[75] Inventors: Eric S. Noya, Groton; Randy M. Arnott, Clinton; Mitchell N. Rosich, Groton, all of Mass.

[73] Assignee: Digital Equipment Corporation, Maynard, Mass.

[21] Appl. No.: 929,085

[22] Filed: Aug. 12, 1992

[51] Int. Cl.6 .......................... G06F 7/32; G06F 12/00
[52] U.S. Cl. ..................................... 395/275; 395/425; 395/250; 364/252.7; 364/962.2; 364/DIG. 1
[58] Field of Search ................ 395/275, 425, 250, 775

[56] References Cited

U.S. PATENT DOCUMENTS

| | | | |
|---|---|---|---|
| 3,814,921 | 6/1974 | Nibby et al. | 235/153 |
| 4,131,942 | 12/1978 | Gillett et al. | 364/200 |
| 4,298,929 | 11/1981 | Capozzi | 364/200 |
| 4,437,155 | 3/1984 | Sawyer et al. | 364/200 |
| 4,489,378 | 12/1984 | Dixon et al. | 364/200 |
| 4,636,946 | 1/1987 | Hartung et al. | 364/200 |
| 4,779,232 | 10/1988 | Fukunaka et al. | 365/189 |
| 4,882,642 | 11/1989 | Tayler et al. | 360/78.11 |
| 4,972,316 | 11/1990 | Dixon et al. | 364/200 |
| 4,972,364 | 11/1990 | Barrett et al. | 364/900 |
| 5,109,485 | 4/1992 | Smith, Jr. | 395/200 |
| 5,109,500 | 4/1992 | Iseki et al. | 395/425 |
| 5,146,573 | 9/1992 | Sato et al. | 395/425 |
| 5,197,135 | 3/1993 | Eickemeyer et al. | 395/375 |
| 5,235,693 | 8/1993 | Chinnaswamy et al. | 395/425 |

*Primary Examiner*—Thomas C. Lee
*Assistant Examiner*—Rehana P. Krick
*Attorney, Agent, or Firm*—Arthur W. Fisher; Dirk Brinkman

[57] ABSTRACT

A method for reducing the number of I/O requests required to write data to a disk drive of a computer system. The computer system includes a read cache for storing old data read from the disk drive, and a write cache for storing new data to be written to the disk drive. The method selectively merges old data in the read cache with new data in the write cache to form at most two physically contiguous data segments which can be written to the disk drive with at most two I/O requests.

2 Claims, 3 Drawing Sheets

METHOD FOR MERGING MEMORY BLOCKS, FETCHING ASSOCIATED DISK CHUNK, MERGING MEMORY BLOCKS WITH THE DISK CHUNK, AND WRITING THE MERGED DATA

FIELD OF THE INVENTION

This invention relates to the control of disk drives for use with a computer system, and more particularly to a system and apparatus for writing data to disk drives using data merging.

BACKGROUND TO THE INVENTION

Current computer systems suffer from an imbalance between central processor unit (host) and input/output (I/O) performance. In recent years, host speed has increased tremendously. However, during the same period, the I/O speed of secondary storage devices, such as disk drives has not kept pace.

Whereas host performance is, to a large extent, related to the speed of its electronic components, disk drive I/O performance is dominated by the time it takes for the mechanical parts of the disk drives to move to the locations where data are stored. The time required to position a read/write head relative to the recording surfaces of a disk drive is generally known as the seek time. Seek times for random accesses to data stored on disk drives are, on the average, orders of magnitude longer than the time it takes to actually transfer the data between the host and the disk drives.

Prior art disk drives have provided a buffer between the host and the disk drives to improve I/O speed. Such an buffer is typically in the form of a memory cache (cache) to take advantage of the principles of locality of reference, which are well-known in computer programming. These principles indicate that when data stored at one location are accessed, there is a high probability that data stored at physically adjacent locations will be accessed soon afterwards in time.

A typical prior art cache stores disk drive data in semiconductor memory, which has relatively fast access time, when compared to the seek time of disk drives. During the operation of the computer system, data transfers between the host and the disk drives are buffered through the cache. For example, during a read operation, the data are first read into the cache before being transferred to the host, and during a write operation, the data are stored in the cache before the data are written to the disk drives. Thus, as long as the data remain in cache, I/O requests are serviced by cache instead of by the disk drive.

By having a cache as an interface between the host and the disk drives, the number of disk I/O transfers are reduced since there is a high probability that the data accessed are already stored in cache. In other words, only a fraction of the number of I/O requests for disk data initiated by the host, hereinafter "host I/O requests," will actually result in physical "disk I/O requests" with inherently long access or latency times. In other words, if the requested data are already in cache, the host I/O request will not result in a physical I/O request. That is, a cache increases the ratio of relatively fast host I/O requests to relatively slow disk I/O requests to improve overall I/O performance.

Write data stored in cache are susceptible to corruption or total loss due to component or power failures until written to disk. Therefore, write cache is generally non-volatile memory. However, high speed non-volatile memory is relatively expensive, and therefore, cost constraints influence the size of cache.

The management of the cache is a major operational bottleneck for computer systems having multiple concurrent users and a large number of data files. Since the data storage capacity of cache is generally only a fraction of the total storage capacity of the disk drives, cache space must be managed. As cache is filled with data to be written to the disk drives, additional space must be made available for new data. Typical prior art system write data from cache to the disk drives in a least recently used (LRU) manner. An LRU algorithm frees cache space by writing older or least recently used to disk before newer or most recently used data (MRU) to increase the likelihood of accessed data being in cache.

Another consideration in managing cache space is the amount of memory space that is individually allocatable to users for a data transfer. Most modern disk drives can transfer large amounts of data, or multiple disk sectors with a single physical I/O request. Also, the amount of data which are read by a random access database application are generally substantially larger than the amount of data that are modified or written. Based on these factors it would seem that the individually allocatable amounts of memory space should be sized relatively large.

However, by having the allocatable amounts of memory space relatively large, the quantity of individually allocatable amounts of memory space for users is decreased, which increases the rate of cache depletion, locking out other users, and decreases the computer system I/O throughput. Therefore, cache space is usually organized in individually allocatable amounts of memory space which are sized relatively small. For example, allocatable cache memory space is frequently sized to the minimum amount of data which can be transferred to and from the disk drive with a single physical I/O request, for example, a sector. This minimally sized amount of individually allocatable memory space will be referred to hereinafter as a "block."

To reduce the rate of physical I/O transfers due to smaller cache blocks, some prior art systems combine or merge cache blocks during a physical I/O write request as follows. When additional memory space is needed in the cache to store new data, a search is made in the cache to identify the LRU block. The LRU block is the block storing data least recently used by the host, used meaning any read or write access to any of the data stored in a block. After the LRU block has been identified, a second search is made in cache to identify any other blocks which store data which are destined for sectors which are physically contiguous with the sector of the LRU block. All blocks thus identified are then merged into a single larger data segment which is written to the disk drive with a single physical I/O request. Thus, not only are the number of physical I/O requests reduced, but also additional cache memory space is made available for new data. However, even with block merging, the number of physical I/O request are still more than the optimal number that could potentially be achieved with larger blocks and a more expensive larger cache.

Accordingly a system is needed for use with disk drives of a computer system which is capable of supporting a large number of users without an increase in cost of cache memory, and yet has a substantial improvement in I/O performance.

SUMMARY OF THE INVENTION

The present invention provides a system which improves the I/O performance of a computer system. The computer system includes a central processor unit or "host" connected to a disk drive by a system bus. Also connected to the system bus are read and write caches.

The write cache is non-volatile memory to ensure data integrity, and the read cache is less expensive volatile memory. The size of the read cache is substantially larger than the size of the write cache, for example by a factor of eight. Data space in the write cache is individually allocatable in relatively small amounts, for example, the amount of data stored in one sector of a disk drive, hereinafter known as a block. Data space in the read cache is individually allocatable in relatively large amounts, for example the amount of data stored in eight blocks or a chunk.

Blocks and chunks in the write and read cache are individually allocatable in a least recently used (LRU) manner. That is, as additional memory space is needed in the write or read caches, blocks or chunks which were least recently used are deallocated before blocks or chunks which were most recently used (MRU). The deallocation of a block in the write cache includes the step of writing the data stored in the block to the disk drive.

In order to write a block of data, the system identifies the least recently used (LRU) block stored in the write cache for writing to the disk drive. The chunk which includes the LRU block is also identified. If all of the blocks of the write chunk are stored in either the write cache or in the read cache, the blocks are merged into a single contiguous data segment to be written to the disk drive. If some of the blocks of the write chunk are stored in the write cache but none of the blocks of the write chunk are stored in the read cache, a determination is made of the number of data segments that would be created if physically adjacent blocks of the write chunk are merged with one and another. If the result yields a number greater than two, the missing blocks are read into the read cache by reading the entire corresponding chunk and merging the missing blocks now stored in the read cache with the blocks in the write cache to form a single contiguous data segment to be written to the disk drive. Otherwise, if the result yields two, merge the blocks of the write chunk into two contiguous data segments to be written to the disk drive.

DESCRIPTION OF THE PREFERRED EMBODIMENT

Figure 1:
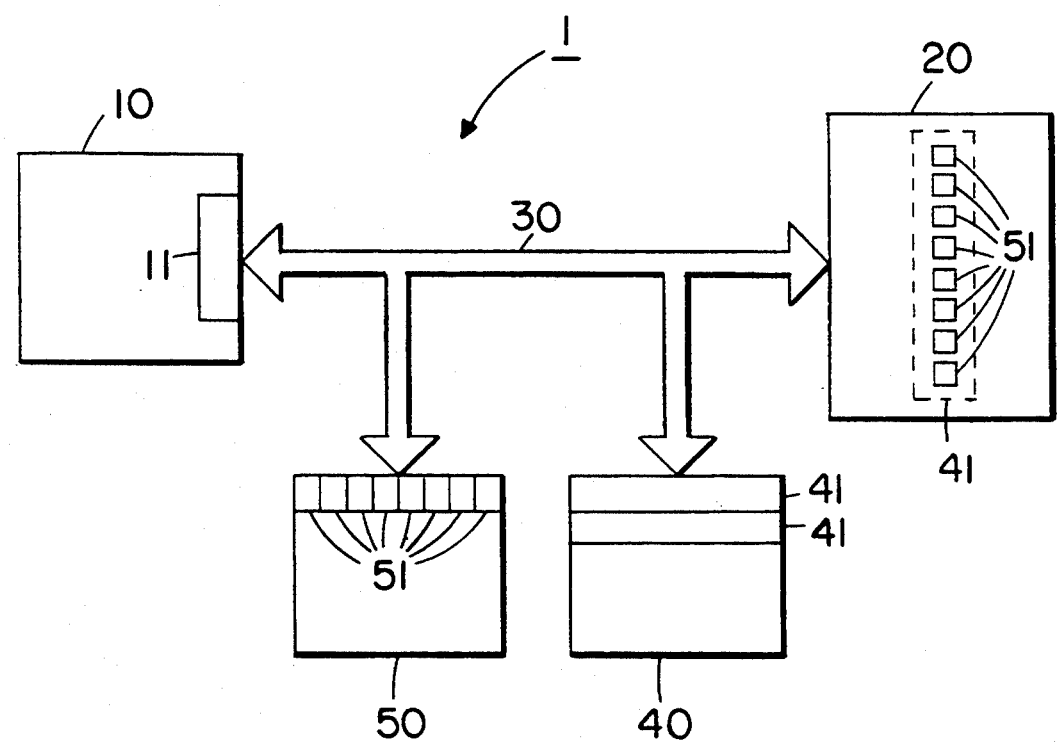
FIG. 1 is a block diagram of a computer system incorporating the invention.

FIG. 1 shows a computer system according to the present invention. The system includes a central processor unit or "host" 10 having primary temporary data storage, such as memory 11, and secondary permanent data storage, for example, a disk drive 20. The host 10 and disk drive 20 are connected by a communication bus 30.

The host 10 is generally conventional and of the type that supports a multiple number of concurrent users executing a wide variety of computer applications, including database applications which use the disk drive 20 for storing data. During operation of the computer system, the host 10 issues I/O requests to transfer data between memory 11 and the disk drive 20 via the bus 30. The disk drive 20 is generally conventional and can use magnetic or optical encoding techniques, or the like. Although FIG. 1 shows a single disk drive 20, the invention can also be used with computer systems having multiple disk drives, or other forms of secondary permanent storage, such as tape drives, having characteristically long access or seek times.

The storage space of the disk drive 20 is physically organized into, for example, sectors, tracks, and cylinders. However, in order to simplify access by the host 10, the storage space of the disk drive 20 is also logically organized into a set of sequentially numbered virtual blocks (blocks), generally indicated by reference numeral 51. Each block 51 addressable by its virtual block number (VBN). By using virtual blocks 51, the details of the physical organization of the disk drive 20, for example, the number of sectors per track and the number of tracks per cylinder, do not need to be known by the users of the host 10. In the preferred embodiment, a block 51 of data is equal to the minimal amount of data that can be conveniently transferred between the host 10 and the disk drive 20 with a single I/O request, for example, a sector.

A host I/O request to transfer data includes as parameters an initial VBN, a count of the number of blocks 51 to be transferred, and a command indicating the type of transfer, for example, read or write. From these parameters system software computes the physical disk address to position the mechanical components of the disk drive 20 prior to transferring the data between the host 10 and the disk drive 20.

The principles of locality of reference, which are well known in computer programming, indicate that when data at one location are accessed, there is a high probability that data at adjacent locations will be accessed soon thereafter. Hence, it makes sense, when reading a particular block 51, to also read physically adjacent blocks 51 with the same I/O request. By simultaneously reading physically adjacent blocks 51, future I/O requests can be anticipated and eliminated.

Accordingly, physically contiguous blocks 51 are further organized into larger sections of data, hereinafter referred to as "chunks," generally indicated by reference numeral 41. In the preferred embodiment, a chunk 41 is equal to 8 blocks 51. Chunks 41 can also be other sizes, such as any amount of data that can be transferred without having to reposition the mechanical components of the disk drive 20, preferably an integral number of sectors. Each chunk 41 is addressable by a virtual chunk number (VCN). The VCN of a chunk 41 containing a particular block 51 can easily be computed by taking the quotient that results from the division of the VBN of the block 51 by the number of blocks 51 per chunk 41.

To further exploit the principles of locality of reference, the computer system is also provided with memory buffer cache (cache). Presumably, the host 10 can access data stored in a semiconductor memory cache considerably faster than data stored on the disk drive 20. Data frequently used by the host 10 are retained in cache for as long as possible to decrease the number of physical I/O requests to transfer data between the host 10 and the disk drive 20. Accordingly, the computer system 1 includes a read cache 40 and a write cache 50, also connected to the bus 30, as shown in FIG. 1.

In the preferred embodiment, the read cache 40 comprises 32 MB of dynamic random access memory (DRAM). The read cache 40 can be made relatively large by using low cost volatile DRAM. Since the data stored in the read cache are duplicated on the disk drive 20, the data stored in the read cache 40 can easily be restored from the disk drive 20 after, for example, a system failure. Data stored in the read cache 40, and therefore also on the disk drive 20, are designated "old data."

Memory space in the read cache 40 for storing data read from the disk drive 20 is individually allocatable to the users of the host 10 in sizes corresponding to chunks 41. In other words, an I/O read request by the host 10 for any data stored in a block 51 (by VBN) will cause the entire chunk 41 (by VCN) containing that block 51 to be read into the read cache 40, unless the chunk 41 is already stored in cache 40. Data stored in a chunk 41 which is read from the disk drive 20 in response to a host I/O read request is stored in the read cache 40 and transferred to the memory 11 of the host 10. Subsequent access to the same data, as long as the chunk 41 storing that data remain in the read cache 40, is generally serviced directly from the read cache 40, eliminating additional physical I/O requests.

The write cache 50 comprises 4 megabytes (MB) of random access memory. Host I/O write requests store new or modified data in the write cache 50, and physical I/O write requests transfer the data from the write cache 50 to the disk drive 20, generally some time thereafter. While the write data are stored in the write cache 50, that is, before the data are written to permanent storage on the disk drive 20, the data are vulnerable to corruption due to, for example, power or system failures. For this reason, the write cache 50 is relatively expensive non-volatile memory. Data stored in the write cache 50, which is not yet stored on the disk drive 20, are designated "new data."

Memory space in the write cache 50 for storing data is allocated to the users in quantities equal to the size of a block 51. A block 51, as previously stated is equal to, for example, the amount of data that can be stored in a sector of the disk drive 20.

If data in a block 51 are modified, subsequent read access to the data, until the block 51 is written to the disk drive 20, will be from the write cache 50 and not from the read cache 40. If a block 51 in the write cache 50 is written to the disk drive 20, and the corresponding block 51 is also stored in the read cache 40 as part of a chunk 41, the corresponding data in the chunk 41 in the read is also updated to contain the same data as the block 51 written to the disk drive 20.

To take further advantage of the principles of locality of reference with a limited amount of cache memory space, allocatable chunks 41 and blocks 51 are managed in an least recently used (LRU) manner. LRU algorithms are well known in computer programming, and can be implemented in any number of ways. In general, an LRU algorithm deallocates memory space in an aged order. Deallocation is the process of making portions of cache memory space available for other uses.

Memory space storing data which were least recently used (LRU) is deallocated before memory space storing data which was most recently used (MRU), used meaning any access, read or write, to the data. In case of the read cache 40, deallocation simply means reading old data from the disk drive 20 into the chunk 41 storing the LRU data. Before new data in the write cache 50 are overwritten or deallocated, that data are first stored on the disk drive 20.

Figure 2:
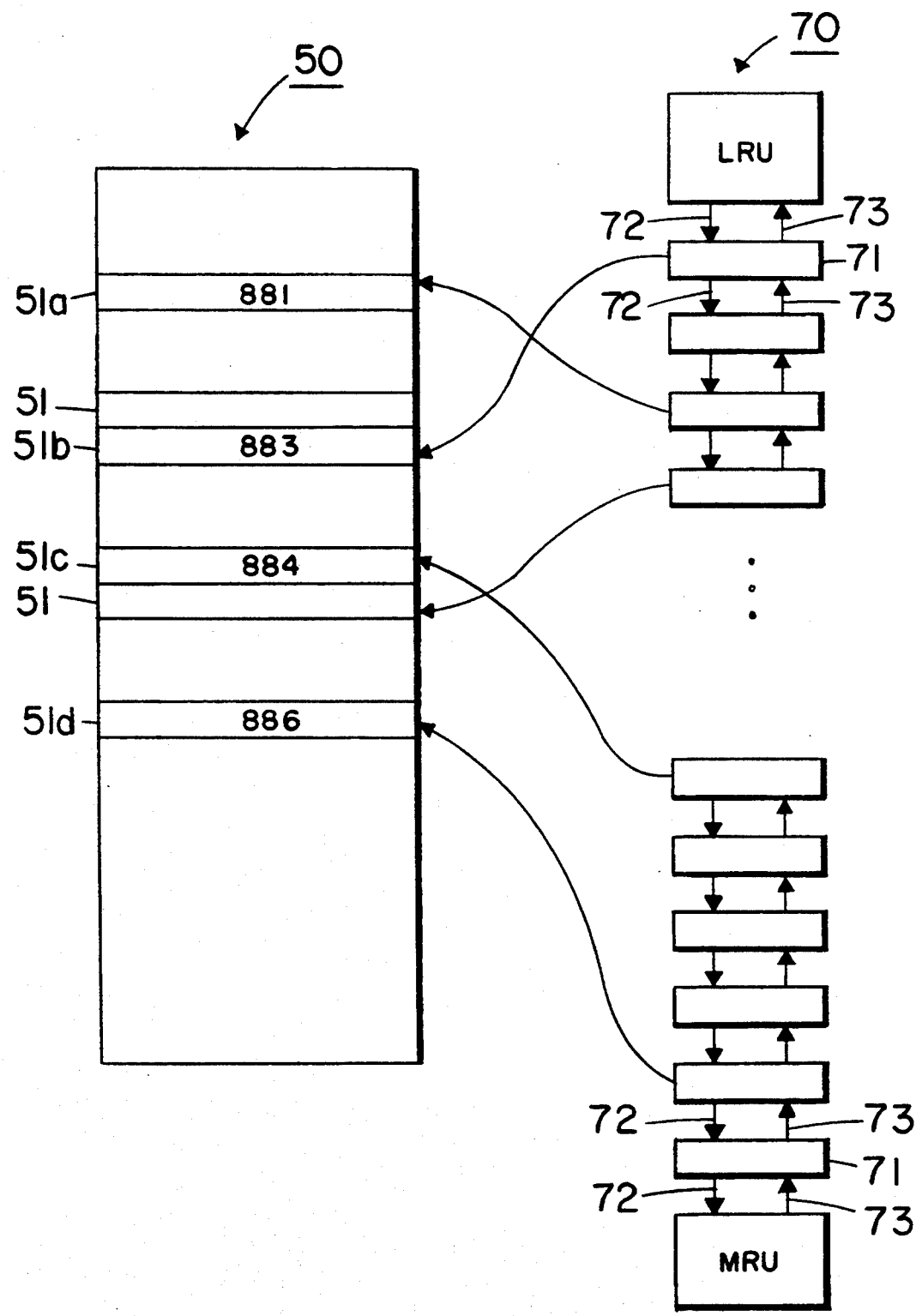
FIG. 2 is a block diagram of a least recently used list.

In general, an LRU algorithm is implemented by means of an LRU list 70, as shown in FIG. 2. For the purpose of illustrating the invention, the LRU list 70 for the write cache 50 is described. It should be understood that a similar LRU list can be constructed for the read cache 40. The LRU list 70 is nothing more than an ordered set of entries 71, each entry 71 referencing an allocatable amount of cache memory space, for example, blocks 51a, 51b, 51c, and 51d having, for example, VBNs "881", "883", "884," and "886," respectively. The entries 71 are sequenced in aged order by next and previous pointers 72 and 73, respectively. For example, block 51b having a VBN of "883" is the least recently used block (LRU) block.

Now returning to the previously described pathological principles of locality of reference. These principles indicate that access to data in short periods of time tends to be physically clustered. However, during operation of the computer system, the chunks 41 and blocks 51 in the respective caches 40 and 50, of FIG. 2, becomes quite fragmented. That is, the physical sequence of the chunks 41 and blocks 51 of the caches 40 and 50 bears no resemblance to the physical sequence of the same chunks 41 or blocks 51 when stored on the disk drive 20.

The fragmentation of the caches 40 and 50 presents a problem, particularly with respect to the write cache 50. Writing data to the disk drive 20, such as would occur when blocks 51 are deallocated, will generally require multiple I/O write requests, one for each fragmented block 51. That is, when the LRU block is written to the disk drive 20, other blocks 51 in the write cache 50, which are stored on the disk drive 20 near the LRU block and which are also likely candidates for deallocation, can generally not be written with a single I/O request.

Some prior art systems have reduced the number of physical I/O write requests for writing data from a fragmented cache by merging techniques. Merging techniques typically combine fragmented data stored in cache to be deallocated into larger contiguous data segments which are written to the disk drive 20 with a single physical I/O write request.

For example, when additional space is needed in the write cache 50 to store new data, a search is made to identify the LRU block 51b ("883"). After the LRU block 51 a has been identified, a second search is made in the write cache 50 to identify any other blocks 51 which store data which are destined for sectors which are physically contiguous with the sector of the LRU block 51b, for example, block 51c ("884"). The blocks 51b and 51c, ("883" and "884") thus identified, which are fragmented in the write cache 50 but physically adjacent on the disk drive 20, are then merged into a single larger data segment which is written to the disk drive 20 with a single physical I/O write request.

However, such prior art merging techniques, may still result in the transfer of relatively small data segments each requiring an I/O write request to store data on the disk drive 20. In the preferred embodiment of the invention, the total number of I/O requests can be further reduced, by merging new data stored in blocks 51 in the write cache 50, with old data stored in chunks 41 in the read cache 40 to produce larger contiguous segments.

Figure 3:
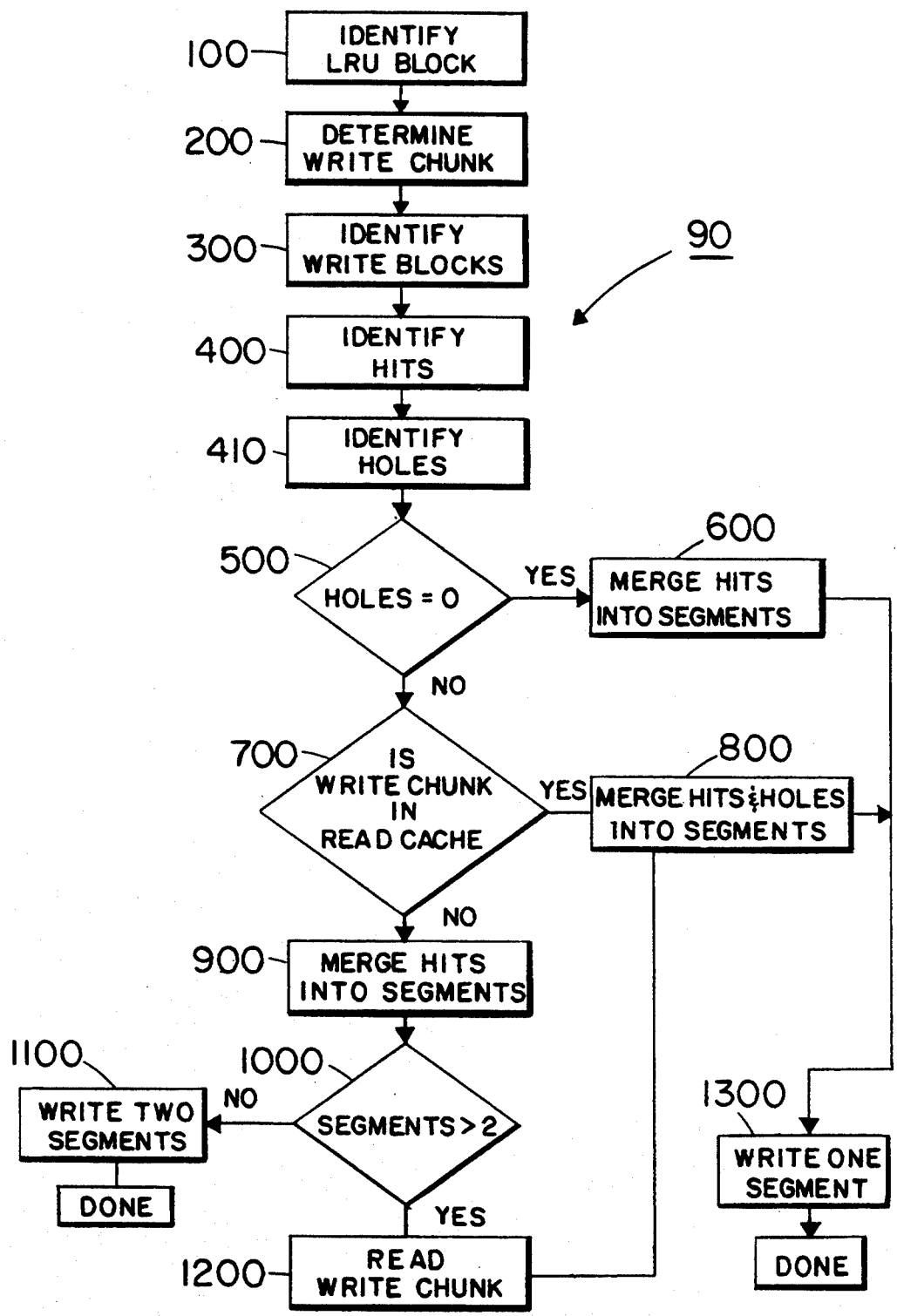
FIG. 3 is a flow chart of a procedure used with the system of the invention.

FIG. 3 shows a flow chart of a procedure 90 which merges data stored in the write cache 50 with data stored in the read cache 40 in order to write new data as chunks 51 with the least number of I/O requests possible.

In procedure 90, beginning with step 100 of the procedure, the computer system identifies the VBN of the LRU block which is to be deallocated. For example, with reference to FIG. 2, the LRU block is block 51b ("883").

In step 200, the computer system determines the corresponding VCN of the chunk which contains the LRU block. This chunk is designated the "write chunk." For example, if the VBN is "883," and there are 8 blocks per chunk, the VCN is "110."

In step 300, the computer system identifies the VBNs of all blocks which are in the write chunk, whether or not they are in the write cache 50. These blocks are designated "write blocks." The VBNs for chunks with a VCN of "110" are "880,""881,""882,""883,""884,""885,""886," and "887."

In step 400, the computer system identifies which of the write blocks are stored in the write cache 50. These blocks are designated "hits." The example in FIG. 2 shows a write cache 50 storing blocks 51a–51d, having VBNs of "881,""883,""884," and "886." These four blocks 51a–51d are the hits.

In step 410, the computer system identifies the write blocks which are not stored in the write cache 50, these blocks are designated "holes."for example, blocks having VBNs "880,""882,""885," and "887" are holes.

In step 500, the computer system determines if the number of holes is equal to zero. This is not the case in the example shown.

If the answer in step 500 is yes, that is, the number of holes is equal zero, or all of the write blocks are stored in the write cache 50, the computer system proceeds with step 600. Otherwise, if the answer in step 500 is no, the number of holes is not equal to zero, or some of the write blocks are not stored in the write cache 50, the computer system proceeds with step 700.

In step 600, the computer system merges the hits into a single contiguous data segment, and then proceeds with step 1300.

In step 700, the computer system determines if the write chunk is stored in the mad cache 40.

If the answer in step 700 is yes, that is the write chunk is stored in the read cache 40, proceed with step 800. Otherwise, if the answer in step 700 is no, that is, the write chunk is not stored in the read cache 40, the computer system proceeds with step 900.

In step 800, the computer system merges into a single contiguous data segment, the hits as stored in the write cache 50 with the holes as stored in the read cache 40, and then proceed with step 1300.

In step 900, the computer system merges hits, which are physically adjacent when stored on disk, into one or more contiguous data segments in cache.

In step 1000, the computer system determines if the number of data segments thus created in step 900 is greater than two.

If the answer in step 1000 is no, that is, the number of individual data segments created in step 900 is not greater than two, than proceed with step 1100. Otherwise, the answer in step 1000 is yes, that is the number of data segments created in step 900 is greater than 2, the computer proceeds with step 1200.

In step 1100, the computer system writes the two data segments to the disk drive 20, and then the procedure is done.

In step 1200, the computer system reads the write chunk into read cache 40, and then proceeds with step 800.

In step 1300, the computer system writes the data segment to the disk drive 20, and then the procedure is done.

The procedure 90 maximizes the number of physically contiguous data blocks that can be written from a cache to a disk drive with at most two I/O requests, even if the data blocks are more than two physically contiguous data segments. By using the procedure 90, which optimally merges blocks stored in a read and write cache, the writing of new data to a disk drive is made more efficient over prior art techniques.

While there has been shown and described a preferred embodiment, it is to be understood that various other adaptations and modifications may be made within the spirit and scope of the invention.

What is claimed is:

1. A method implemented in a computer for merging data to be written to a disk drive of the computer, the disk drive organized into a plurality of disk chunks for storing data, each disk chunk of the plurality of disk chunks including a plurality of disk blocks, comprising:

identifying a memory block to be written to the disk drive, said memory block stored in a non-volatile memory of the computer, said memory block storing data associated with a corresponding one of said disk blocks, said corresponding one of said disk blocks included in a particular disk chunk;

determining if said non-volatile memory stores additional memory blocks associated with said particular disk chunk;

if said additional memory blocks when merged with said memory block form more than two physically contiguous data segments, reading said particular disk chunk into said volatile memory as a memory chunk, merging said additional memory blocks with said memory block and said memory chunk, and writing said memory chunk to the disk drive after merging; and otherwise if said additional memory block when merged with said memory block form less than three physically contiguous data segment, writing said less than three physically contiguous data segments to the disk drive to update said particular disk chunk in no more than two physical accesses to the disk drive.

2. The method of claim 1 further comprising:

identifying a least recently used memory block of the non-volatile memory to be written to the disk drive.

* * * * *